United States Patent
Chou et al.

(10) Patent No.: US 10,247,582 B2
(45) Date of Patent: Apr. 2, 2019

(54) OPTICAL ENCODING DEVICE INCLUDING AN ENCODING DISC HAVING DIFFRACTING PATTERNS

(71) Applicant: Industrial Technology Research Institute, Hsinchu (TW)

(72) Inventors: Ming-Chieh Chou, Kaohsiung (TW); Chi-Hung Lee, Hsinchu County (TW); Ching-Chang Chen, Tainan (TW); Yi-Cheng Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 128 days.

(21) Appl. No.: 15/414,630

(22) Filed: Jan. 25, 2017

(65) Prior Publication Data
US 2018/0113008 A1    Apr. 26, 2018

(30) Foreign Application Priority Data
Oct. 21, 2016 (TW) .............................. 105134007 A (51) Int. Cl.
*G01D 5/38* (2006.01)
*G01D 5/347* (2006.01)

(52) U.S. Cl.
CPC ............. *G01D 5/3473* (2013.01); *G01D 5/38* (2013.01)

(58) Field of Classification Search
CPC ...................................................... G01D 5/38
See application file for complete search history.

(56) References Cited

U.S. PATENT DOCUMENTS

| 5,694,218 A | 12/1997 | Fukui et al. |
| 5,917,182 A | 6/1999 | Ishizuka |
| 6,154,278 A | 11/2000 | Ito et al. |
| 6,588,333 B1 | 7/2003 | Homer et al. |

(Continued)

FOREIGN PATENT DOCUMENTS

| CN | 1171560 | 1/1998 |
| TW | 475053 | 2/2002 |
| TW | I416082 | 11/2013 |

OTHER PUBLICATIONS

"Office Action of Taiwan Counterpart Application," dated Nov. 8, 2017, p. 1-p. 7, in which the listed references were cited.

(Continued)

*Primary Examiner* — Thanh Luu
(74) *Attorney, Agent, or Firm* — JCIPRNET (57) ABSTRACT

An optical encoding device includes a light source module, an encoding disc, and a photodetector. The light source module emits a source beam. The encoding disc is disposed on a passing path of the source beam. The encoding disc has first diffracting patterns. The first diffracting patterns include a plurality of sets of first diffracting patterns arranged along a radial direction of the encoding disc. Each set of the first diffracting patterns includes a plurality kinds of first diffracting patterns having different pattern extending directions and different pattern periods. When the encoding disc is rotating, the first diffracting patterns in each set of first diffracting patterns enter the passing path of the source beam in sequence, to cause a diffraction and form diffracted beams having different angles. The photodetector receives the diffracted beams having the different angles.

17 Claims, 6 Drawing Sheets

(56) References Cited

U.S. PATENT DOCUMENTS

| | | |
|---|---|---|
| 6,654,128 B2 | 11/2003 | Takayama et al. |
| 6,803,560 B1 | 10/2004 | Okumura et al. |
| 6,906,315 B2 | 6/2005 | Tobiason |
| 7,102,123 B2 | 9/2006 | Chin et al. |
| 7,309,855 B2 | 12/2007 | Nagasaka et al. |
| 7,391,010 B2 | 6/2008 | Okada et al. |
| 7,439,489 B2 | 10/2008 | Sasaki |
| 7,449,678 B2 | 11/2008 | Ito |
| 7,550,710 B2 | 6/2009 | McAdam et al. |
| 7,612,327 B2 | 11/2009 | Okada |
| 7,619,208 B2 | 11/2009 | Masada et al. |
| 7,649,168 B2 | 1/2010 | Hane et al. |
| 7,663,093 B2 | 2/2010 | Kusano |
| 7,820,957 B2 | 10/2010 | Kimura et al. |
| 7,825,368 B2 | 11/2010 | Kusano |
| 7,907,286 B2 | 3/2011 | Holzapfel |
| 7,939,795 B2 | 5/2011 | Powell |
| 7,943,897 B2 | 5/2011 | Okada |
| 8,141,265 B2 | 3/2012 | Ellin et al. |
| 8,148,674 B2 | 4/2012 | Yoshida |
| 8,188,420 B2 | 5/2012 | Lee |
| 8,188,421 B2 | 5/2012 | Hane |
| 8,193,483 B2 | 6/2012 | Chin et al. |
| 8,212,202 B2 | 7/2012 | Wong et al. |
| 8,311,131 B2 | 11/2012 | Woyzichovski |
| 8,330,098 B2 | 12/2012 | Thor et al. |
| 8,492,703 B2 | 7/2013 | Tobiason et al. |
| 8,546,743 B2 | 10/2013 | Fujita |
| 8,546,744 B2 | 10/2013 | Yoshida et al. |
| 8,610,050 B2 | 12/2013 | Yamamoto et al. |
| 8,637,805 B2 | 1/2014 | Altendorf et al. |
| 8,666,261 B2 | 3/2014 | Takahashi |
| 8,674,287 B2 | 3/2014 | Yoshida et al. |
| 8,742,321 B2 | 6/2014 | Koiso et al. |
| 8,772,705 B2 | 7/2014 | Rai |
| 8,835,832 B2 | 9/2014 | Chew et al. |
| 8,847,144 B2 | 9/2014 | Soo et al. |
| 8,933,392 B2 | 1/2015 | Harada |
| 9,068,862 B2 | 6/2015 | Hopp et al. |
| 2008/0100849 A1* | 5/2008 | Chang .................. G01D 5/3473 356/521 |
| 2010/0245841 A1 | 9/2010 | Parriaux et al. |
| 2011/0069390 A1 | 3/2011 | Yoshida et al. |

OTHER PUBLICATIONS

Mohan, J.K et al., "Devising Simulink Optical Encoder Pulse Manipulation and its Evaluation", Intelligent Systems Design and Applications (ISDA), 2012 12th International, Nov. 2012, 640-644.

Carr, J et al., "Optical encoder readhead chip", Electronics System-Integration Technology Conference, 2008, Sep. 2008, 797-802.

Lihui Liang et al., "The design of composite optical encoder", Electronic Measurement & Instruments, 2009, Aug. 2009, 2-642-2-645.

D. Hopp et al, "A novel diffractive encoding principle for absolute optical encoders", Optical Measurement Systems or Industrial Inspection VII, Mar. 2011.

* cited by examiner

OPTICAL ENCODING DEVICE INCLUDING AN ENCODING DISC HAVING DIFFRACTING PATTERNS

CROSS-REFERENCE TO RELATED APPLICATION

This application claims the priority benefit of Taiwan application serial no. 105134007, filed on Oct. 21, 2016. The entirety of the above-mentioned patent application is hereby incorporated by reference herein and made a part of this specification.

TECHNICAL FIELD

The disclosure relates to an optical encoding device.

BACKGROUND

An encoder of a sensor usually utilizes an optical, magnetic or mechanical contact way to sense the location, and outputs an electrical signal converted from the location for being a feedback signal to control the location. The encoders can be divided into rotary encoders and linear encoders according to the motion mode. A rotary encoder is usually installed in the rotating objects, such as a motor shaft. The rotary encoder may convert the rotating location or the rotating amount into the analog signal, such as analog quadrature signal, or the digital signal, such as 32-bit parallel signal or digital orthogonal signals.

An encoder may be absolute-typed or incremental-typed. The signals output from absolute-typed encoder partition the position information into a plurality of regions, and each region has its unique number. Therefore, even when lacking the previous location information, the unique number output from the encoder still can provide the definite location information. The signal of the incremental-typed encoder is periodic, and the signal itself cannot provide definite location information. Only continuously counting the signals could obtain the definite location information when a certain location is taken as a reference.

Take the high-level machine tool (machining accuracy is about 1 micron) as an example, the server system of the machine tool usually uses the absolute-typed optical encoder having 24-bit per revolution. With the introduction of energy saving and lightweight design, an optical encoder of high positioning resolution may face the problems of the processing size and the assembly accuracy. Also due to the reduction of scale, the optical encoder encounters the environmental oil pollution and the vibration problem, thereby resulting in signal distortion or even failure. In addition, conventional optical encoders are designed by using geometric optics. It is easy to cause the sensing interference of the adjacent beams.

SUMMARY

The embodiments of the disclosure provide an optical encoding device, which may overcome the resolution limitation of optical encoders using principles of geometrical optics, and thereby reducing the difficulty in assembling the elements, enhancing the assembly margin and significantly reducing assembly costs. It also reduces the interference caused by the environmental pollution and the vibration problem.

In an embodiment of the disclosure, an optical encoding device is provided. The optical encoding device comprises a light source module, an encoding disc and a photodetector. The light source module is configured to emit a source beam. The plurality of first diffracting patterns, and the plurality of first diffracting patterns include a plurality of sets of first diffracting patterns arranged along a radial direction of the encoding disc, each set of the first diffracting patterns includes a plurality kinds of the first diffracting patterns having different pattern extending directions and different pattern periods or one of the pattern extending directions or the pattern periods is the same, and the pattern extending directions and the pattern periods of different set of first diffracting patterns are different from each other. When the encoding disc is rotating, the plurality of first diffracting patterns of each set of first diffracting patterns enter the passing path of the source beam in sequence, so as to cause a diffraction and form a plurality of diffracted beams having different angles. The photodetector includes a plurality of first light sensors to receive the plurality of diffracted beams having the different angles, respectively.

DESCRIPTION OF THE EMBODIMENTS

Figure 1:
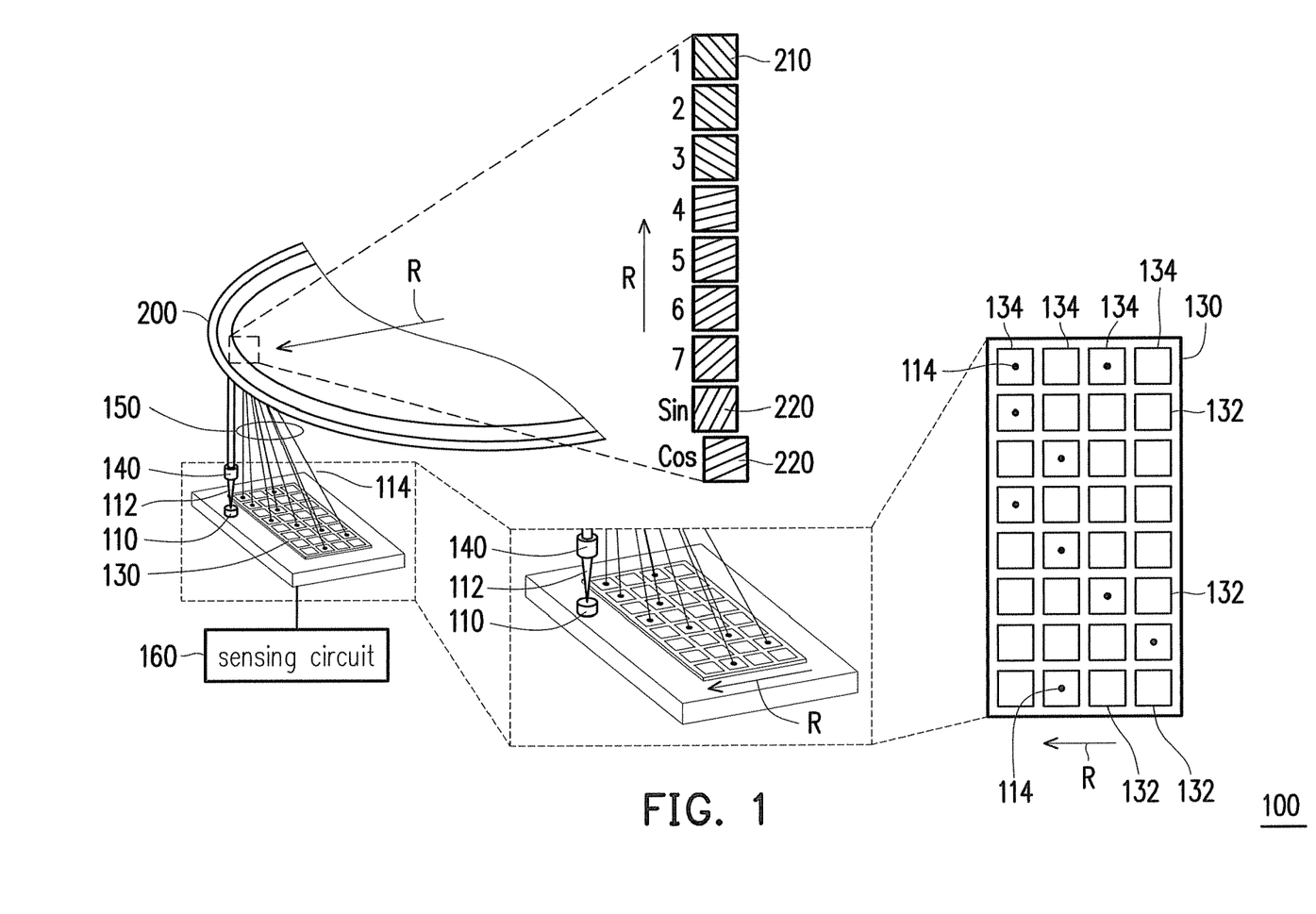
FIG. 1 is a schematic diagram of an optical encoding device according to an embodiment of the disclosure.
Figure 2:
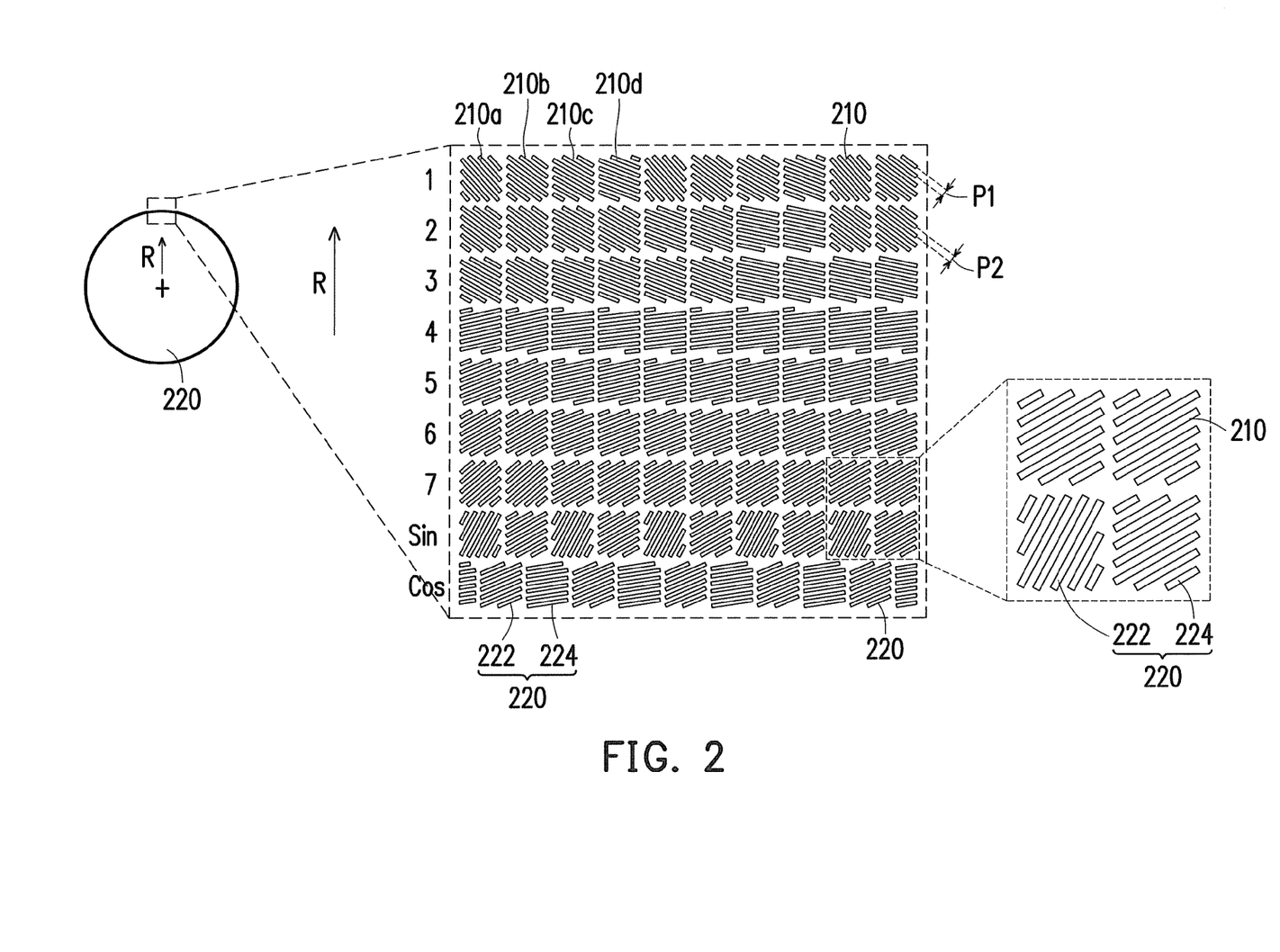
FIG. 2 is an enlarged schematic diagram of the encoding disc.

FIG. 1 is a schematic diagram of an optical encoding device according to an embodiment of the disclosure, and FIG. 2 is an enlarged schematic diagram of the optical encoding disc of FIG. 1. Referring to FIG. 1 and FIG. 2, an optical encoding device 100 of the disclosure includes a light source module 110, an encoding disc 200 and a photodetector 130. The light source module 110 is configured to emit a source beam 112. In the embodiment of the disclosure, the light source module 110 is a laser emitter and the source beam 112 is a laser beam. In other embodiments, the light source module 110 may be a light-emitting diode (LED). The encoding disc is disposed on the passing path of the source beam 112. In the embodiment of the disclosure, the optical encoding device 100 further includes at least one lens disposed on the passing path of the source beam 112, taking a lens 140 in FIG. 1 as an example, so as to converge the source beam 112 onto the encoding disc 200.

The encoding disc 200 has a plurality of first diffracting patterns 210, and those first diffracting patterns 210 include a plurality sets of first diffracting patterns arranged along a radial direction R of the encoding disc 200, such as the set of the column having number 1 and those sets of columns having numbers 2~7, respectively. The direction of each of the aforesaid columns and the following columns may be, such as the direction perpendicular to the radial direction R. The direction of each of the following rows may be, such as the direction parallel to the radial direction R. Each set (which means each column) of first diffracting patterns 210 includes a plurality kinds of first diffracting patterns 210 having different pattern extending directions and different pattern periods, respectively. The number of each kind of first diffracting patterns 210 may be more than one, and those first diffracting patterns 210 may be repeated in a certain arranging period. In the present embodiment, there are four patterns varied sequentially in a column, and those four patterns of different columns are also different. Generally speaking, each of first diffracting patterns 210 may be, but not limited to a grating pattern, and those first diffracting patterns 210 may have different pattern extending directions and different pattern periods or one of pattern extending directions or pattern periods of those first diffracting patterns may be the same. For example, those first diffracting patterns may be multi-kinds of first diffracting patterns having grating stripes with different extending directions and periods or having one of the extending directions or periods is the same. For example, first diffracting patterns 210a, 210b, 210c, and 210d of the first diffracting patterns 210 of the set (which means the column) of number 1 having different extending directions and periods of grating stripes.

Also, any combination of pattern extending directions and pattern periods of different sets of first diffracting patterns 210 is different. For example, at least one of the extending direction and period P1 of grating stripes of the set of first diffracting patterns 210 of number 1 is different from at least one of the extending direction and period P2 of grating stripes of the set of first diffracting patterns 210 of number 2.

When the encoding disc 200 is rotating, the plurality of first diffracting patterns 210 of each set of first diffracting patterns 210 enter the passing path of the source beam 112 in sequence, so as to diffract and form the diffracted beams 114 having different angles. For example, at a first time, those first diffracting patterns 210 of the same row with the first diffracting patterns 210a of the plurality of sets (which means a plurality of columns) of the first diffracting patterns 210 of numbers 1~7 enter the passing path of the source beam 112. And in a second time, those first diffracting patterns 210 of the same row with the first diffracting patterns 210b of the plurality of sets (which means a plurality of columns) of the first diffracting patterns 210 of numbers 1~7 enter the passing path of the source beam 112, and so on.

The photodetector includes a plurality of first light sensors 132 for respectively receiving those diffracted beams 114 having different angles. For example, those first light sensors 132 form a sensing array module, such as the first light sensors 132 are arranged in a 4*7 array in FIG. 1. The size of the pattern period of the first diffracting pattern 210 determines the size of the diffracted angle of diffracted beams 114, and thereby determining the emitting location of diffracted beams 114 on the sensing array module is far away from or near to the source beam 112. On the other hand, the pattern extending direction of the first diffracting pattern 210 determines the diffracted direction of the diffracted beams 114, and thereby determining the emitting location of the diffracted beams 114 on the sensing array module with respect to the location of the source beam 112. For example, by appropriately designing the pattern period and the pattern extending direction of those first diffracting patterns 210, the diffracted beams 114 diffracted from the set of first diffracting patterns 210 of number 1 may take turns to be irradiated onto the four first light sensors 132 of the first row of the sensing array module, and the diffracted beams 114 diffracted from the set of first diffracting patterns 210 of number 2 may be selectively irradiated onto one of the four first light sensors 132 of the second row of the sensing array. And so on, each diffracted beams 114 diffracted from the N-th column of first diffracting pattern 210 may be selectively irradiated onto one of four first light sensors 132 of the N-th row of the sensing array module, and N for example is 1~7. Wherein in this embodiment, each set (each column) of first diffracting patterns 210 includes first diffracting patterns 210 having four different kinds of pattern extending directions and pattern periods, then the diffracted beams 114 diffracted by the first diffracting patterns 210 may be selectively irradiated onto one of four first light sensors 132 of one row of the sensing array module. Therefore, by analyzing which first light sensor 132 of each row (radial direction R is row) of the photodetector 130 detects the diffracted beams 114 at the first time, it may know the encoding disc 200 is rotating to which row of first diffracting patterns 210, thereby obtaining the rotating location of the encoding disc 200 at this time. In addition, at least one of the arrangement and the period of the kinds (for example, four kinds) of those sets (those columns) of first diffracting patterns 210 may be different, so as to have the arrangement of different rows (which means rows of radial direction R) of the first diffracting patterns being different. Thus the encoding disc 200 may define $4^7$ rotating locations, and the $4^7$ rotating locations may respectively correspond to $4^7$ arrangements of whether 4*7 first light sensors 132 detecting the diffracted beams 114 or not. Therefore, in the present embodiment, the optical encoding device 100 may reach the resolution of 14 bits pre revolution by utilizing those first diffracting patterns 210.

Figure 7A:
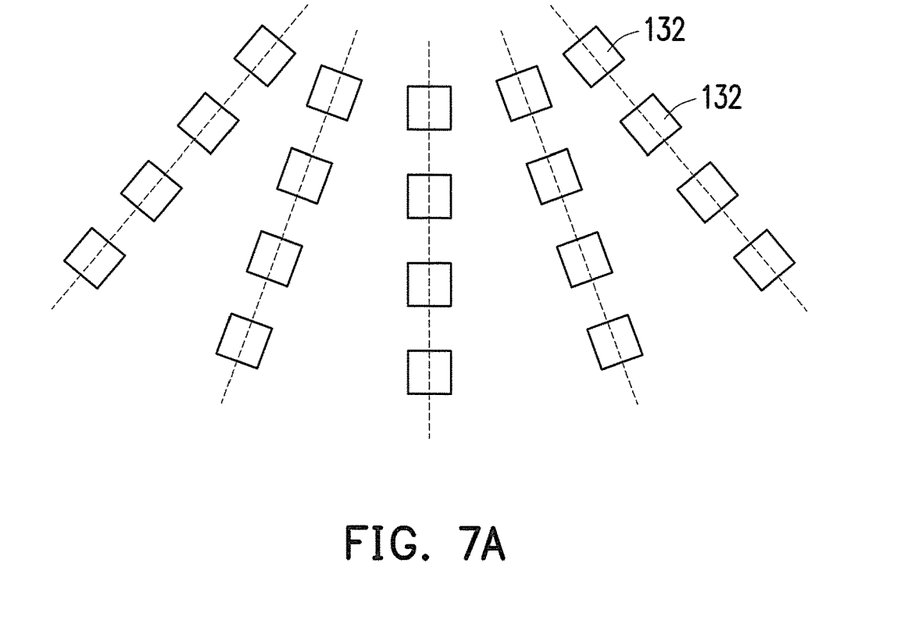
FIGS. 7A to FIG. 7C illustrate three kinds of arrangements of the first optical sensor of FIG. 1, respectively.
Figure 7B:
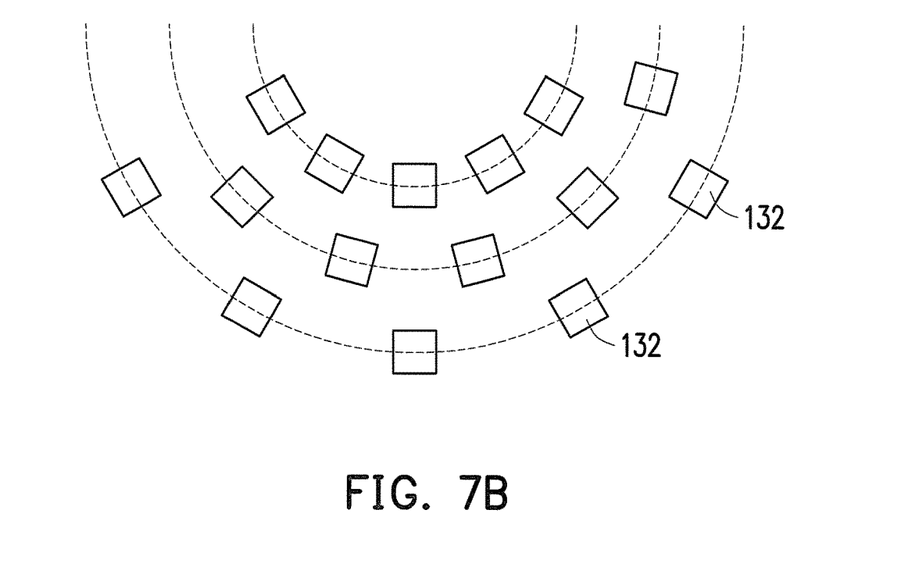

In the present embodiment, if the array arranged by the first light sensors 132 is a rectangular array, the pattern extending directions and the pattern periods of different sets of first diffracting patterns 210 are all different. In another embodiment, if the array arranged by the first light sensors 132 is fan-shaped, as shown in FIG. 7A, the extending direction of different sets of first diffracting patterns 210 may be the same, and the pattern period may be different. Yet in another embodiment, if the first light sensors 132 are arranged on multiple concentric reference circles, as shown in FIG. 7B, the pattern extending directions of different sets of first light sensors 132 may be different, but the pattern periods may be the same.

In the present embodiment, the optical encoding device 100 further comprises a sensing circuit 160 electrically connected to the photodetector 130 for analyzing a plurality of signals transmitted from those different first light sensors 132, and obtaining the rotating location of the encoding disc 200, for example, obtaining the rotating location of encoding disc 200 by the abovementioned method.

In the present embodiment, the optical encoding device 100 may further comprises at least one lenses. FIG. 1 takes a lens 150 as an example, the at least one lenses is disposed on the passing path of the diffracted beams 114, to converge those diffracted beams 114 onto the photodetector 130. In other embodiments, the optical encoding device 100 may include no lens 150 and the diffracted beams 114 from the encoding disc 200 are directly irradiated onto the photodetector 130.

In an embodiment of disclosure, the encoding disc 200 further comprises a plurality second diffracting patterns 220. Those second diffracting patterns 220 include at least one set of second diffracting patterns 220. Take a set of second diffracting patterns 220 labeled by Sin and a set of second diffracting patterns 220 labeled by Cos, shown in FIG. 2, as an example. Those sets of first diffracting patterns 210 and those sets of second diffracting patterns 220 are arranged along the radial direction R of the encoding disc 200. Each second diffracting pattern 220 has a plurality of sub-diffracting patterns, taking two sub-diffracting patterns 222 and 224 in FIG. 2 as an example, so as to respectively diffract the source beam 112 and form a plurality of diffracted beams 114 having different angles.

Also, in the present embodiment, the photodetector 130 further includes a plurality of second light sensors 134 for respectively receiving the diffracted beams 114 diffracted from those sub-diffracting patterns 222 and 224. In the embodiment of the disclosure, the pattern extending directions and the pattern periods of sub-diffracting pattern 222 and 224 are all different or one of those is different for respectively diffracting the source beam 112 and forming a plurality of diffracted beams 114 having multiple different locations. In addition, the sensing circuit 160 obtains the rotating location of the encoding disc 200 according to the analysis of the signal strength transmitted from those second light sensors 134. When the sub-diffracting patterns 222 and 224 sequentially enter the passing path of the source beam 112, the diffracted beams 114 from the sub-diffracting pattern 222 and the diffracted beams 114 from the sub-diffracting pattern 224 are sequentially transmitted to two second light sensors 134. And the strength of the diffracted beams detected by those two second light sensors will vary with the tiny rotation of the encoding disc 200, thereby showing different degrees of bright and dark variation. Therefore, by analyzing the light strength variation detected by those second light sensors 134 (that is, corresponding to the signal strength transmitted by the those second light sensors 134), each location of the encoding disc 200 defined by the first diffracting patterns may further be divided into such as $2^{10}$ locations, so that the resolution of the optical encoding device 100 may reach 24 bits per revolution.

Also, the set of second diffracting patterns 220 labeled by Sin and the set of second diffracting patterns 220 labeled by Cos may have an offset perpendicular to the radial direction R, as shown in FIG. 2, to produce a phase difference. By using the phase difference between those sets of signals Sin and Cos, it helps to enhance the accuracy of the subdivided signals at the $2^{10}$ locations. In addition, for example, the two sub-diffracting patterns 222 and 224 of the set of second diffracting patterns 220 labeled by Sin will make the diffracted beams 114 be respectively transmitted to the two second light sensors 134 at the left-hand side of the top row of the photodetector 130 in FIG. 1, and the two sub-diffracting patterns 222 and 224 of the set of second diffracting patterns 220 labeled by Cos will make the diffracted beams 114 be respectively transmitted to the two second light sensors 134 at the right-hand side of the top row of the photodetector 130 in FIG. 1, but the aforesaid embodiments do not limit the scope of the disclosure.

Figure 7C:
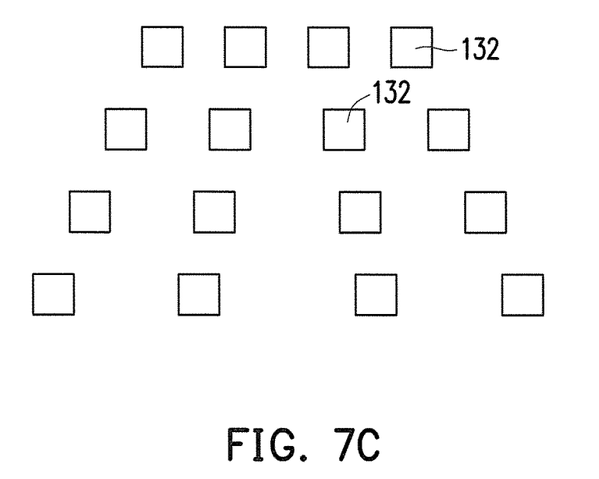

In the present embodiment, the photodetector 130 having 4*8 light sensors (including the first light sensors 132 and the second light sensor 134) is taken as an example. But the scope of the disclosure does not limit on the number of the light sensors of the photodetector 130, the number of rows and columns of the array and arrangement of light sensors. For example, the arrangement of light sensors may not be rectangular-shaped, and it may be a fan-shaped arrangement or trapezoidal arrangement, as shown in FIG. 7C. In the present embodiment, each set (each column) of first diffracting patterns 210 has 32 kinds of pattern extending directions and 16 kinds of pattern periods for making combinations.

According to the aforesaid and other embodiments, a way in which the plurality of first light sensors are arranged may be chosen from a group consisting of a rectangle array, a trapezoid array, a fan-shaped distribution and an irregular distribution, or the plurality of first light sensors may be arranged on multiple concentric reference circles, respectively.

In the present embodiment, those sets of second diffracting patterns 220 are disposed on one side of those sets of first diffracting patterns 210 along the radial direction R. In another embodiment, those sets of second diffracting patterns 220 may be disposed on the central area of those sets of first diffracting pattern 210 along the radial direction. For example, two sets of second diffracting patterns 220 labeled by Sin and Cos, respectively, may be disposed between two sets of first diffracting patterns 210 numbered 4 and 5. Because the central area of the source beam 112 irradiates onto those sets of first diffracting patterns 210 numbered 1~7 and irradiates onto those sets of second diffracting patterns 220 labeled by Sin and Cos have stronger intensity, it needs to correspondingly dispose those two sets of second diffracting patterns 220 labeled by Sin and Cos to be further divided, on the central area of the source beam 112, so that the $2^{10}$ divided locations of disposing those two sets of second diffracting patterns 220 labeled by Sin and Cos may be analyzed more accurately.

In an embodiment of the disclosure, each first light sensors 132 and each second light sensors 134 may be such as a photodiode (PD) or an avalanche photodiode (AVD).

In an embodiment of the disclosure, the distribution areas of each first diffracting patterns 210 and each second diffracting patterns 220 may be square, rectangle, rhombus, circle, ellipse, triangle or polygon. FIG. 1 takes the square as an example, but the aforesaid embodiments do not limit the scope of the disclosure.

Figure 3:
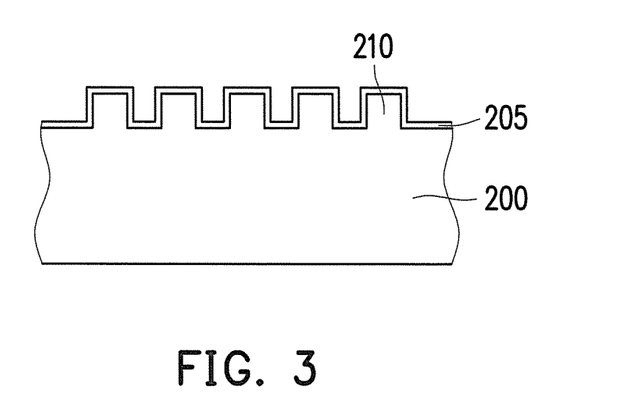
FIG. 3 is a partial schematic diagram of the encoding area of the encoding disc.

In an embodiment of the disclosure, the encoding disc 200 is a non-transparent encoding disc, and the source beam 112 and those diffracted beams 114 are on the same side of the encoding disc 200. In another embodiment of the disclosure, the surface of the encoding disc 200 is coated with a reflecting film, as shown in FIG. 3. The reflecting film 205 is, for example, coated on the surface of first diffracting patterns 210 and second diffracting patterns 220, which are the diffracting grating patterns having periodic bumps, and the surface on the encoding disc 200 is outside first diffracting patterns 210 and second diffracting patterns 220. The material of the reflecting film 205 is, for example, aluminum, gold, other metals having good reflectivity, or non-metallic material having good reflectivity. Therefore, the light intensity of the diffracted beams 114 diffracted to the photodetector 130 may be significantly improved.

In an embodiment of the optical encoding device 100, a plurality sets of first diffracting patterns 210 are used and arranged along the radial direction of the encoding disc 200, each set of first diffracting patterns 210 have a plurality kinds of different pattern extending directions and different pattern periods, and the combinations of the pattern extending directions and the pattern periods of different sets of first diffracting patterns 210 are different. And the plurality of first light sensors 132 are used to receive those diffracted beams 114 having different angles. Therefore, the optical encoding device 100 may overcome the resolution limitation of optical encoders using principles of geometrical optics. And the spacing between first light sensors 132 may be increased, thereby reducing the difficulty in assembling the elements, enhancing the assembly margin and significantly reducing assembly costs. It also reduces the interference caused by the environmental pollution and the vibration problem. Similarly, due to second diffracting patterns 220 also using the principles of diffraction, thereby increasing the spacing between second light sensors 134, and therefore the difficulty in assembling the element is reduced, the assembly margin is enhanced and the assembly costs are significantly reduced. It also reduces the interference caused by the environmental pollution and the vibration problem. Furthermore, the optical encoding device 100 according to the embodiment of the disclosure may reach the precision above 24 bits pre revolution, therefore it may realize the high-precision micro optical encoder, and plays an important role in the advanced process domain and the intelligent automation industry in the future.

Figure 4:
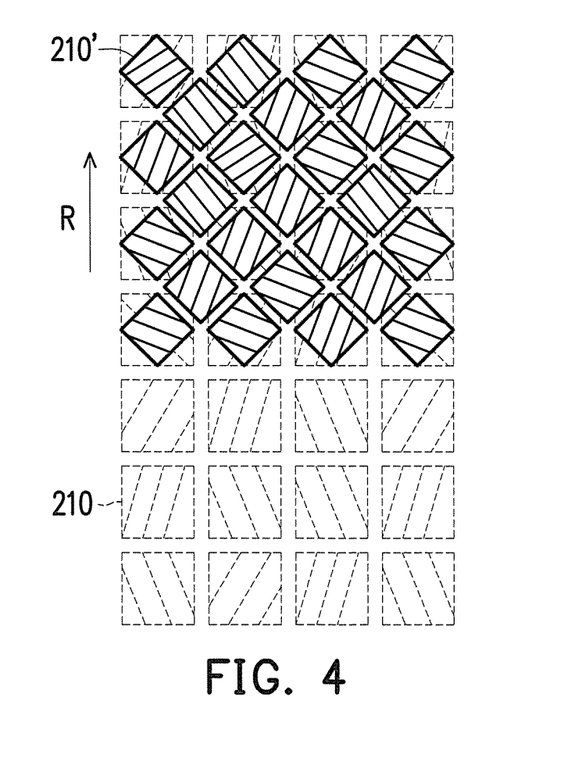
FIG. 4 is a diagram of comparing the first diffracting patterns of another embodiment with the first diffracting patterns of the embodiment of FIG. 1.

FIG. 4 is a diagram of comparing the first diffracting patterns of another embodiment with the first diffracting patterns of the embodiment of FIG. 1. Please referring to FIG. 4, the first diffracting patterns 210' of the embodiment are similar to the first diffracting patterns 210 in FIG. 1, and the difference between those two is described below. The distribution area of first diffracting patterns 210' is rhombus, and the arrangement is rhombic staggered arrangement. The diagonal length of the rhombus is, for example, substantially equal to the side length of square of the first diffracting patterns 210 in FIG. 1. Therefore, the number of first diffracting patterns 210' arranged on the direction perpendicular to the radial direction R, which means the circumference direction, will be more than doubled, and this will increase the resolution of the optical encoding device to be 15 bits pre revolution.

Figure 5:
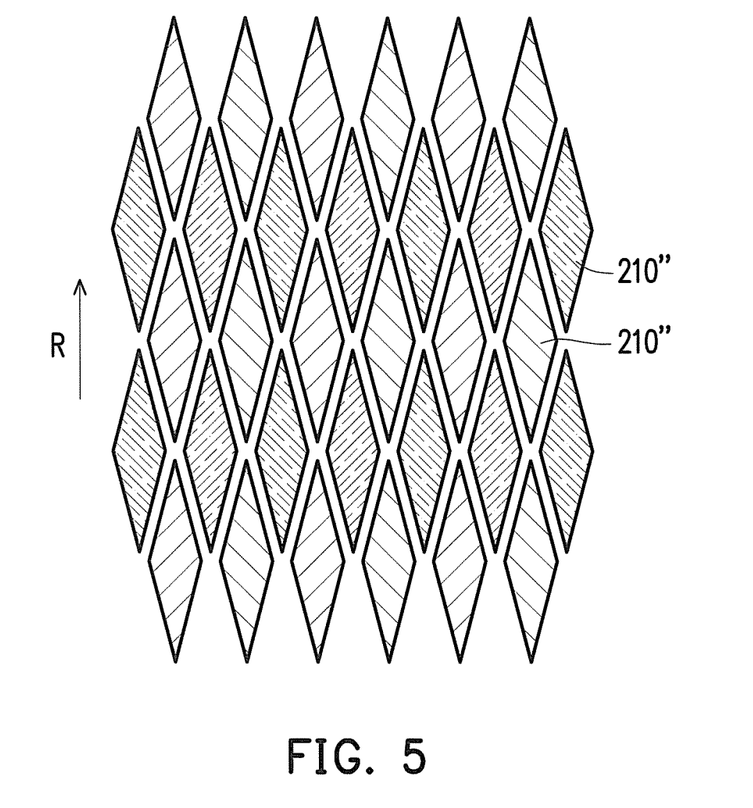
FIG. 5 is a schematic diagram of first diffracting patterns of another embodiment of the disclosure.

FIG. 5 is a schematic diagram of first diffracting patterns according to another embodiment of the disclosure. The first diffracting patterns 210" of the embodiment are similar to those first diffracting pattern 210, and the difference between the two embodiments is described below. In the present embodiment of FIG. 5, the distribution area of first diffracting patterns 210" is rhombus, and the arrangement is rhombic staggered arrangement. Besides, the diagonal length of first diffracting patterns 210" in the radial direction R is twice of the side length of first diffracting pattern 210 in FIG. 1, and the diagonal length of first diffracting patterns 210" in the direction perpendicular to the radial direction R maintains equal to the side length of first diffracting patterns 210 in FIG. 1. Thereby, first diffracting patterns 210" may maintain the area equal to the area of first diffracting patterns 210 and enhance the resolution of the optical decoding device up to 15 bits per revolution. The larger the area of first diffracting patterns 210 is, the more amount of the grating stripes can be made, and thereby enhancing the diffracting effect of first diffracting patterns 210.

In other embodiments of the disclosure, the diagonal length of first diffracting patterns 210" in the radial direction R is twice of the side length of first diffracting patterns 210 in FIG. 1, and the diagonal length of first diffracting patterns 210" in the direction perpendicular to the radial direction R is also twice of the side length of first diffracting patterns in FIG. 1. This may maintain the resolution of the optical encoding device to be 14 bits pre revolution under the condition of the area of first diffracting patterns 210" is twice of the area of first diffracting patterns 210 in FIG. 1. Also, it may let the diagonal length of first diffracting patterns 210" in the radial direction R is twice of the side length of first diffracting patterns 210, and the diagonal length of first diffracting patterns 210" in the direction perpendicular to the radial direction R is four times of the side length of first diffracting patterns 210. This may maintain the resolution of the optical encoding device to be 14 bits pre revolution under the condition of the area of first diffracting patterns 210" is four time of the area of first diffracting patterns 210 in FIG. 1.

It should be noted that the scope of the disclosure is not limited on the ratio relationship between the size of first diffracting patterns 210" and first diffracting patterns 210 in FIG. 1 in the radial direction R and in the direction perpendicular to the radial direction R. In other embodiments, it may be other suitable ratio relationship to meet the actual needs of the use. Similarly, the size of second diffracting patterns 220 in the radial direction R and in the direction perpendicular to the radial direction R may make appropriate changes to meet the actual needs of the use.

Figure 6:
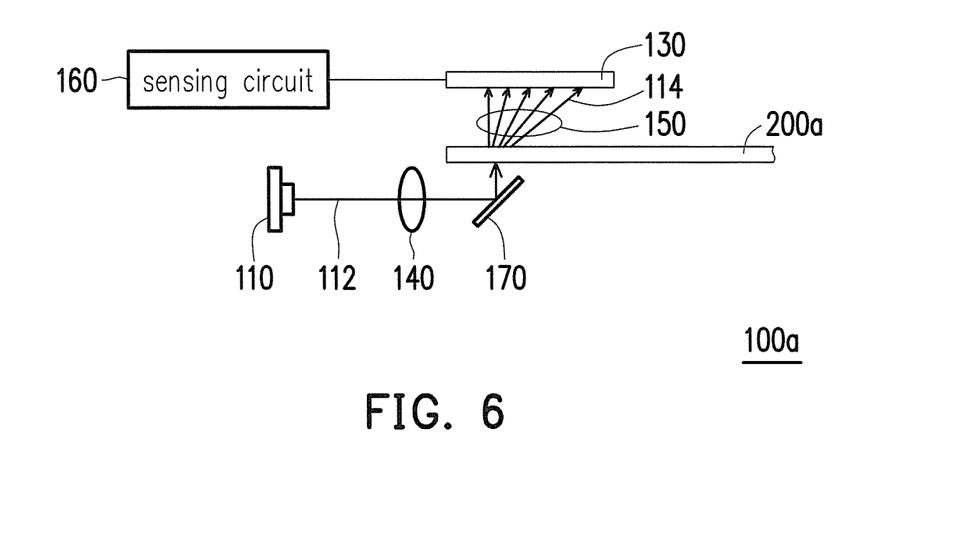
FIG. 6 is a schematic side-view of the optical encoding device according to still another embodiment of the disclosure.

FIG. 6 is a schematic side-view of the optical encoding device according to still another embodiment of the disclosure. Please refer to FIG. 6, an optical encoding device 100a according to the embodiment is similar to the optical encoding device 100 in FIG. 1, and the difference between the two optical devices 100a and 100 is described below. For the optical encoding device 100a of the present embodiment, the encoding disc 200a is a transparent encoding disc, and the source beam 112 and those diffracted beams 114 are on two opposite sides of the encoding disc 200a, respectively. Also, the optical encoding device 100a further includes a reflector 170 disposed on the passing path of the source beam 112, so as to reflect the source beam 112 from the light source module 110 to the encoding disc 200a. The reflector 170 is for example a reflecting mirror, and it may have the source beam 112 turning the light path, so as to reduce the thickness of the optical encoding device 100a. In another embodiment, it may also not use reflector 170, and have the source beam 112 from the light source module 110 being directly irradiating onto the encoding disc 200a.

As mentioned above, the optical encoding device according to the embodiments of the disclosure uses a plurality of sets of first diffracting patterns arranged along the radial direction of the encoding disc, each set of first diffracting patterns includes first diffracting patterns having a plurality of kinds of different pattern extending directions and pattern periods or one of the pattern extending directions or the pattern periods is the same, and the combinations of the pattern extending directions and the pattern periods of different sets of first diffracting patterns are not the same. The plurality of first light sensors are used to respectively receive those diffracted beams having different angles. Therefore, the optical encoding device according the embodiments of the disclosure may overcome the resolution limitation of optical encoders using principles of geometrical optics, and reducing the difficulty in assembling the elements, enhancing the assembly margin and significantly reducing assembly costs. It also reduces the interference caused by the environmental pollution and the vibration problem.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

What is claimed is:

1. An optical encoding device, comprising:
    a light source module configured to emit a source beam;
    an encoding disc disposed on a passing path of the source beam, wherein the encoding disc has a plurality of first diffracting patterns, and those first diffracting patterns include a plurality of sets of first diffracting patterns arranged along a radial direction of the encoding disc, each set of first diffracting patterns includes a plurality kinds of first diffracting patterns, the plurality kinds of first diffracting patterns comply with one of following conditions (a), (b), and (c):

condition (a): the plurality kinds of first diffracting patterns have different pattern extending directions when entering the passing path and different pattern periods;

condition (b): the plurality kinds of first diffracting patterns have same pattern extending directions when entering the passing path and different pattern periods;

condition (c): the plurality kinds of first diffracting patterns have different pattern extending directions when entering the passing path and same pattern periods, wherein the pattern extending directions and the pattern periods of different sets of the first diffracting patterns are different from each other, wherein when the encoding disc is rotating, a plurality of first diffracting patterns in each set of first diffracting patterns enter the passing path of the source beam in sequence, so as to cause a diffraction and form a plurality of diffracted beams having different angles; and a photodetector including a plurality of first light sensors to receive the plurality of diffracted beams having the different angles respectively.

2. The optical encoding device according to claim 1, wherein the light source module is a laser emitter or a light emitting diode.

3. The optical encoding device according to claim 1, further comprising a sensing circuit electrically connected to the photodetector, wherein the sensing circuit is configured to analyze a plurality of signals transmitted form the plurality of first light sensors, so as to obtain a rotating location of the encoding disc.

4. The optical encoding device according to claim 1, wherein the encoding disc is a transparent encoding disc, and the source beam and the plurality of diffracted beams are on the opposite side of the encoding disc.

5. The optical encoding device according to claim 4, further comprising a reflector disposed on the passing path of the source beam, to reflect the source beam from the light source module to the encoding disc.

6. The optical encoding device according to claim 1, wherein the encoding disc is a non-transparent encoding disc, and the source beam and the plurality of diffracted beams are on a same side of the encoding disc.

7. The optical encoding device according to claim 6, wherein a surface of the encoding disc is coated with a reflecting film.

8. The optical encoding device according to claim 1, wherein a shape of a distribution area of each of the plurality of first diffracting patterns is chosen from a group consisting of square, rectangle, rhombus, circle, ellipse, triangle, and polygon.

9. The optical encoding device according to claim 1, wherein each of the plurality of first light sensors is a photodiode or an avalanche photodiode.

10. The optical encoding device according to claim 1, wherein the plurality of first light sensors form a sensing array module.

11. The optical encoding device according to claim 10, wherein a way in which the plurality of first light sensors are arranged is chosen from a group consisting of a rectangle array, a trapezoid array, a fan-shaped distribution and an irregular distribution, or the plurality of first light sensors are arranged on multiple concentric reference circles, respectively.

12. The optical encoding device according to claim 1, wherein the each of the plurality of first diffracting patterns is a diffracting grating pattern.

13. The optical encoding device according to claim 1, further comprising at least one lenses disposed on the passing path of the source beam, to converge the source beam onto the encoding disc.

14. The optical encoding device according to claim 1, further comprising at least one lenses disposed on the passing path of the plurality of diffracted beams, to converge the plurality of diffracted beams onto the photodetector.

15. The optical encoding device according to claim 1, wherein the encoding disc further has a plurality of second diffracting patterns, those second diffracting patterns include at least one set of second diffracting patterns, those sets of first diffracting patterns and second diffracting patterns arranged along a radial direction of the encoding disc, and each of the second diffracting patterns includes a plurality of sub-diffracting patterns for respectively diffracting the source beam to form a plurality of diffracted beams having different angles, and the photodetector further comprises a plurality of second optical sensors for respectively receiving the plurality of diffracted beams from those sub-diffracting patterns.

16. The optical encoding device according to claim 15, wherein the set of second diffracting patterns are disposed on a central area of those sets of first diffracting patterns in the radial direction.

17. The optical encoding device according to claim 15, further comprising a sensing circuit electrically connected to the photodetector, wherein the sensing circuit analyzes a rotating location of the encoding disc according to a signal strength transmitted from those second optical sensors.

* * * * *